United States Patent
Nakaya et al.

(10) Patent No.: US 11,130,668 B1
(45) Date of Patent: Sep. 28, 2021

(54) MOBILE FROZEN FOOD DISPENSER

(71) Applicant: Royal Caribbean Cruises Ltd., Miami, FL (US)

(72) Inventors: Joshua Takashi Nakaya, Miami, FL (US); Anibal Damian Sarno, Miami, FL (US); Joey Hasty, Winter Park, FL (US); Jay Schneider, Miami Beach, FL (US)

(73) Assignee: Royal Caribbean Cruises Ltd., Miami, FL (US)

(*) Notice: Subject to any disclaimer, the term of this patent is extended or adjusted under 35 U.S.C. 154(b) by 0 days.

(21) Appl. No.: 16/867,428

(22) Filed: May 5, 2020

(51) Int. Cl.
*B67D 1/08* (2006.01)
*B67D 1/00* (2006.01)

(52) U.S. Cl.
CPC ......... *B67D 1/0857* (2013.01); *B67D 1/0004* (2013.01); *B67D 1/0804* (2013.01); *B67D 2210/00104* (2013.01); *B67D 2210/00131* (2013.01)

(58) Field of Classification Search
CPC .. B67D 1/0857; B67D 1/0004; B67D 1/0804; B67D 2210/00104; B67D 2210/00131
USPC ......... 222/130, 146.6, 175; 224/148.1–148.7
See application file for complete search history.

(56) References Cited

U.S. PATENT DOCUMENTS

| | | | | |
|---|---|---|---|---|
| 1,780,687 A * | 11/1930 | Smith | ................. | B01F 3/04744 239/20 |
| 2,732,977 A * | 1/1956 | Charpiat | .............. | B67D 1/0857 222/131 |
| 4,869,402 A * | 9/1989 | Ash, Jr. | .................. | B67D 1/045 222/209 |
| 4,921,143 A * | 5/1990 | Billet | ....................... | B67D 1/04 222/175 |
| 4,964,542 A * | 10/1990 | Smith | ...................... | A23G 9/04 222/146.6 |
| 5,069,364 A * | 12/1991 | McGill | .................. | A23G 9/285 222/95 |
| 5,080,261 A * | 1/1992 | Green | .................. | B67D 1/0857 222/129.1 |
| 5,150,820 A * | 9/1992 | McGill | .................... | A23G 3/28 222/146.6 |
| 6,082,589 A * | 7/2000 | Ash | .......................... | B67D 1/04 222/146.6 |
| 6,264,066 B1 * | 7/2001 | Vincent | .................. | A23G 9/228 222/105 |
| 6,378,740 B1 * | 4/2002 | Martin | ..................... | B67D 1/04 222/334 |
| 2019/0047839 A1 * | 2/2019 | Giarratano | ........... | B67D 1/0857 |
| 2019/0150469 A1 * | 5/2019 | Minard | .................... | A23G 9/28 |

* cited by examiner

Primary Examiner — Lien M Ngo
(74) Attorney, Agent, or Firm — Knobbe, Martens, Olson & Bear LLP (57) ABSTRACT

Systems and methods for mobile frozen food dispensers are disclosed. In one aspect, a mobile frozen food dispenser includes a dispensing gun comprising an input configured to control dispensing of frozen food from the dispensing gun and a container configured to store the frozen food and maintain a temperature of the frozen food below a predetermined temperature. The mobile frozen food dispenser further includes a delivery tube connecting the container to the dispensing gun, and a motor configured to drive the frozen food from the container to the dispensing gun via the delivery tube based on a signal received from the input.

20 Claims, 9 Drawing Sheets

MOBILE FROZEN FOOD DISPENSER

BACKGROUND

Technological Field

The present application relates to frozen food dispensers, and in particular, to frozen food dispensers that can be easily transported.

Description of the Related Technology

Frozen foods are traditionally stored and dispensed from a stationary machine configured to keep the frozen food within a predetermined temperature range. Semi-solid frozen foods may have properties dependent on temperature that affect how the frozen food is dispensed. Traditionally, frozen food dispensers include expensive and complex refrigeration in order to maintain the frozen food within the desired temperature range.

SUMMARY

The system, method, and devices of this disclosure each have several innovative aspects, no single one of which is solely responsible for its desirable attributes disclosed herein. Without limiting the scope of this disclosure, its more prominent features will now be discussed briefly. After considering this discussion, and particularly after reading the section entitled "Detailed Description" one will understand how the features of this disclosure provide advantages over other personalized recommendation solutions.

In a first aspect, a mobile frozen food dispenser is provided. The mobile frozen food dispenser includes a dispensing gun comprising an input configured to control dispensing of frozen food from the dispensing gun; a container configured to store the frozen food and maintain a temperature of the frozen food below a predetermined temperature; a delivery tube connecting the container to the dispensing gun; and a motor configured to drive the frozen food from the container to the dispensing gun via the delivery tube based on a signal received from the input.

In some embodiments, the dispenser can further include a frozen food container configured to store the frozen food, a dry ice container configured to store dry ice, and a coolant container configured to store a coolant.

In some embodiments, the frozen food container, the dry ice container and the coolant container are concentric with the frozen food container in the center, the dry ice container surrounding the frozen food container, and the coolant container surrounding the dry ice container.

In some embodiments, the dispenser further includes a coolant line connected to the coolant container and located in proximity to the delivery tube; and a coolant pump configured to pump the coolant through the coolant line so as to cool the frozen food located within the delivery tube.

In some embodiments, the coolant line forms a loop with a first end of the coolant line comprising a cold line configured to receive the coolant from the coolant container and a second end of the coolant line comprises a return line configured to return the coolant to the coolant container after the coolant has travelled through the loop.

In some embodiments, the dispenser further includes an insulating sleeve formed over the delivery tube and the coolant line.

In some embodiments, the dispenser further includes a plunger housed in the container and operatively coupled to the motor, wherein the motor is configured to drive the plunger into the container based on the signal received from the input so as to drive the frozen food from the container into the delivery tube.

In some embodiments, the dispenser further includes a solenoid valve coupled to the delivery tube, the solenoid valve configured to mechanically control flow of the frozen food through the delivery tube; and a controller configured to receive the signal from the input and, in response to the signal received from the input including a command to dispense the frozen food, control the motor to drive the frozen food from the container into the delivery tube and control the solenoid valve to open, thereby allowing the frozen food to flow through the delivery tube.

In some embodiments, the controller is further configured to back-drive the motor to release pressure in the container after the signal received from the input includes a command to stop dispensing the frozen food.

In some embodiments, the dispenser further includes one or more straps coupled to the container and configured to be worn by an operator; and a holster coupled to the one or more straps and configured to house the dispensing gun when not in use.

In some embodiments, the dispensing gun further includes a slit valve configured to dispense the frozen food, a valve collet configured to control flow of the frozen food into the slit valve, a compression spring configured to close the valve collet, and a lever configured to open the valve collet by compressing the compression spring, wherein the input comprises a switch configured to be actuated by the lever.

In some embodiments, the slit valve is formed of silicone and is further configured to prevent leakage of the frozen food from the dispensing gun when the switch is not activated.

In some embodiments, the input comprises a switch configured to be actuated by an operator and control the motor to drive the frozen food from the container.

In another aspect, a frozen food dispenser is provided. The frozen food dispenser includes a dispensing gun configured to dispense frozen food; a container configured to be carried by a user, the container comprising: a frozen food container configured to store the frozen food, a coolant container configured to store a coolant, and a dry ice container configured to store dry ice and cool the frozen food and the coolant; a delivery tube connecting the container to the dispensing gun and comprising a coolant line configured to circulate the coolant so as to cool the frozen food when located in the delivery tube.

In some embodiments, the container further includes a motor configured to drive the frozen food from the frozen food container to the dispensing gun via the delivery tube.

In some embodiments, the dispensing gun comprises an input configured to output a signal, and the dispenser further comprises a controller configured to receive the signal from the input and, in response to the signal received from the input including a command to dispense the frozen food, control the motor to drive the frozen food from the frozen food container into the delivery tube.

In some embodiments, the controller is further configured to back-drive the motor to release pressure in the container after the signal received from the input includes a command to stop dispensing the frozen food.

In some embodiments, the frozen food container, the dry ice container and the coolant container are concentric with the frozen food container in the center, the dry ice container surrounding the frozen food container, and the coolant container surrounding the dry ice container.

In some embodiments, the dispenser further includes a coolant pump configured to pump the coolant through the coolant line so as to cool the frozen food located within the delivery tube.

In some embodiments, the dispenser further includes an insulating sleeve formed over the delivery tube and the coolant line.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Overview

Frozen food dispensers are traditionally stationary machines in part due to the weight of the storage, cooling, and other components. Depending on the environment, such frozen food dispensers can be operated in a self-service fashion, allowing individuals to control the dispensing of the frozen food. In highly trafficked locations (e.g., on board a cruise ship, in a dining hall, etc.) it can be difficult to maintain cleanliness of self-serve devices due to the number of people using the frozen food dispensers. To clean out a self-serve frozen food dispenser, it may be necessary to close the device while the device is being cleaned.

Frozen food dispensers can be adapted to dispense various kinds of frozen foods, including ice cream, gelato, frozen yogurt, milkshakes, etc. The viscosity of frozen foods may change dependent on the temperature and type of the food being dispensed. Thus, it can be important for a frozen food dispenser to maintain the temperature of the frozen food within a predetermined range. Above a certain temperature, the frozen food may also begin to melt, which can increase the chance of leakage. In a traditional stationary frozen food dispenser, potential leakage may be dealt with using a drip tray beneath the dispenser head to catch any melted frozen food.

Mobile Frozen Food Dispenser

Aspects of this disclosure relate to systems and techniques that can be used to store and dispense frozen foods using a mobile frozen food dispenser, which may be small and light enough to be carried by a person. There are a number of technical challenges to the transport and dispensing of frozen food from a mobile dispenser. One challenge is how to control the temperature of the frozen food, both within a frozen food storage container and as the frozen food is dispensed. For example, it may not be practical to use devices such as a refrigerator to cool the frozen food, since refrigerator devices may be too large and/or heavy to be carried by a person.

Another challenge may involve the control of any leaks of melted frozen food. While traditional frozen food dispensers can include a drip tray to catch any leaks, it may not be practical to include a drip tray in a mobile frozen food dispenser. Thus, the control of melting of the frozen food can be an important aspect to maintaining cleanliness for a mobile frozen food dispenser. In particular, the design of a dispensing valve from which the frozen food is dispensed can be an important factor in preventing leakage.

A mobile frozen food dispenser can provide a number of advantages over more traditional stationary frozen food dispensers. For example, mobile frozen food dispensers can be carried into areas where it may not be practical to install a stationary frozen food dispenser (e.g., outdoors, into areas without electrical connections and/or plumbing, etc.). A mobile frozen food dispenser can also attract people by becoming an event where people can gather for a short period of time. An operator can carry the mobile frozen food dispenser into areas with a large number of people, such as near a pool, onboard a cruise ship, around a theme park, etc.

Figures 1A, 1B:
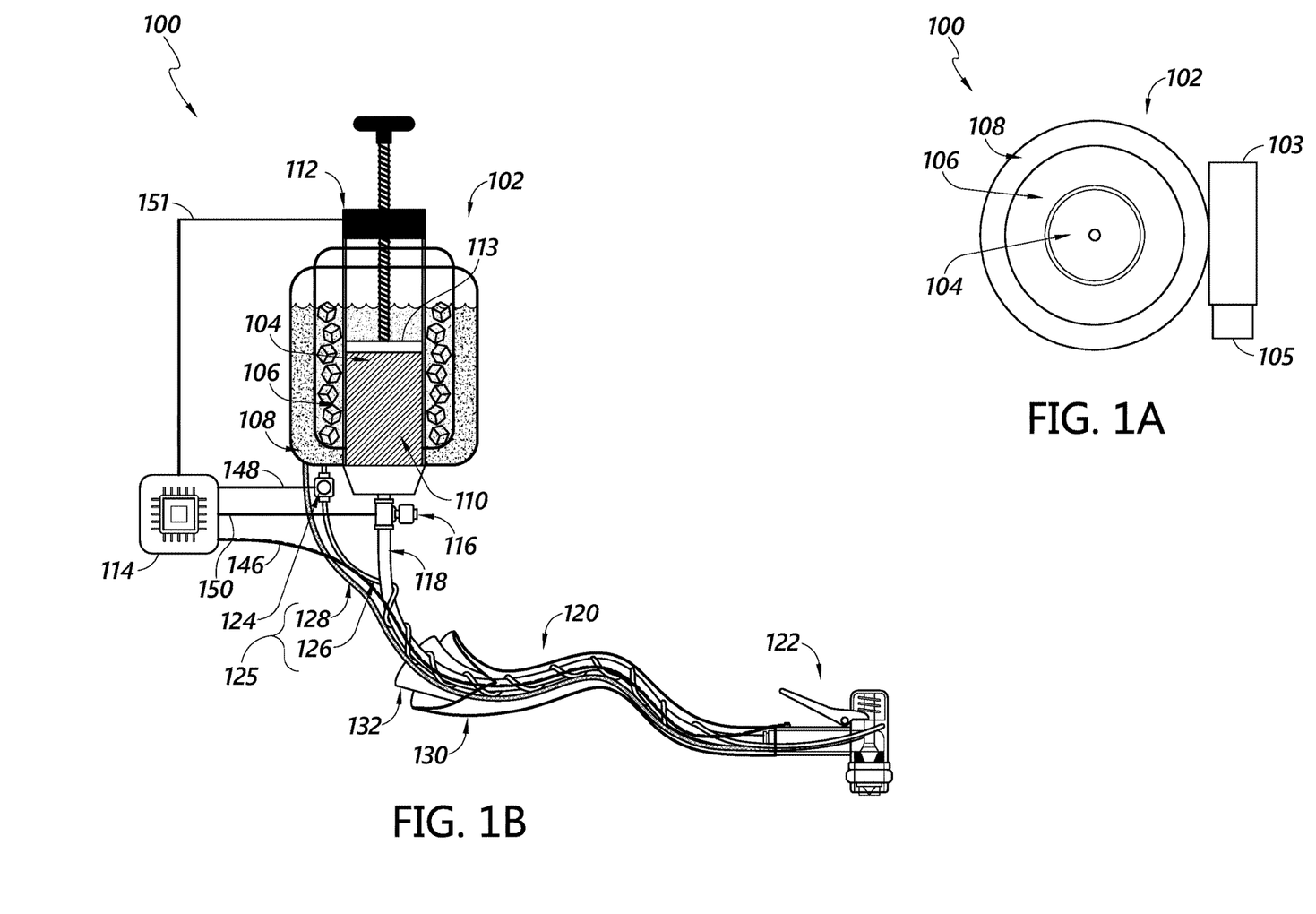
FIGS. 1A-1C illustrate a number of views of an example mobile frozen food dispenser in accordance with aspects of this disclosure.
Figure 1C:
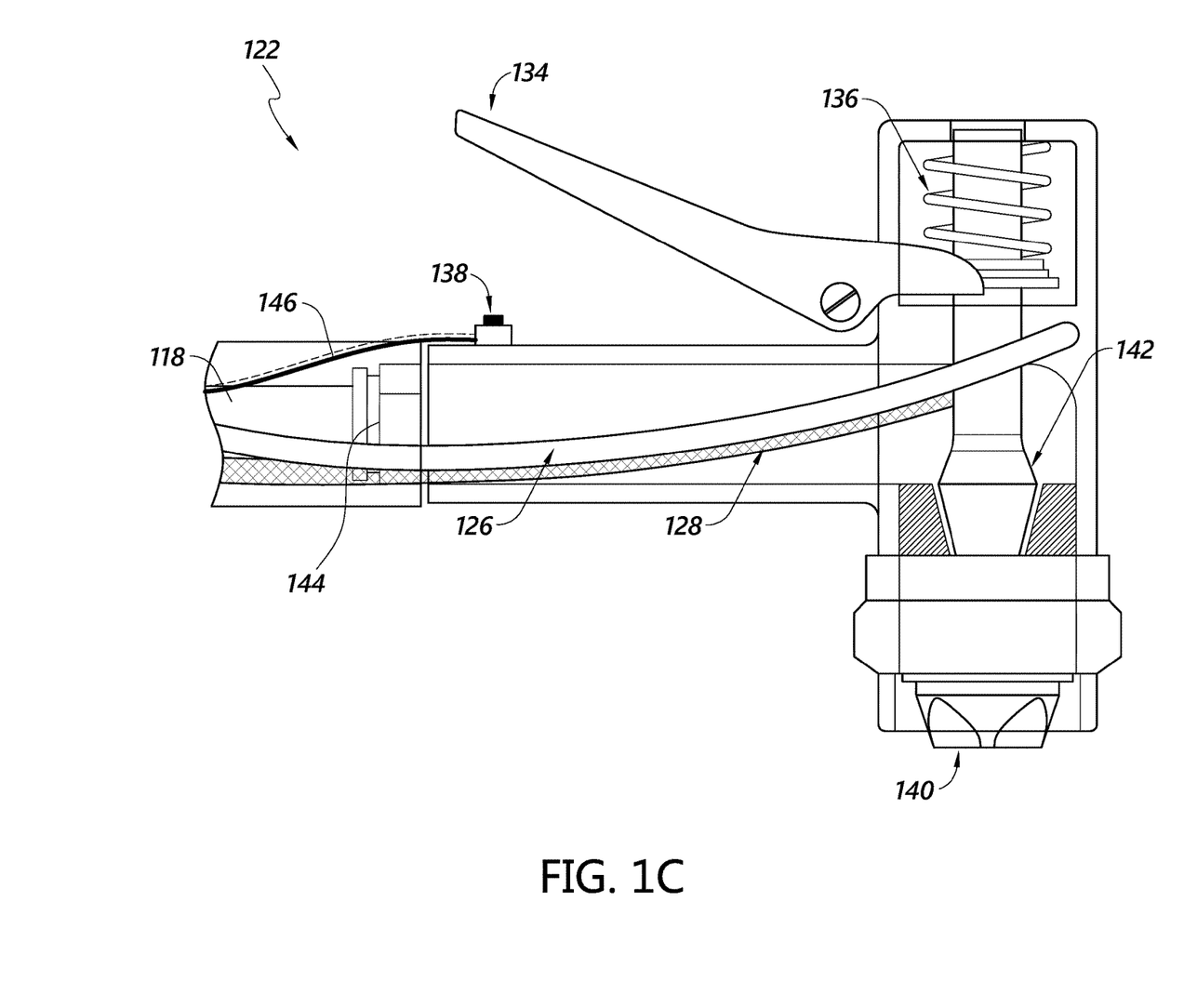

FIGS. 1A-1C illustrate a number of views of an example mobile frozen food dispenser 100 in accordance with aspects of this disclosure. In particular, FIG. 1A illustrates a top view of a container 102, FIG. 1B illustrates a side view of the mobile frozen food dispenser 100, and FIG. 1C illustrates a dispensing gun 122. With reference to FIGS. 1A-1C, the mobile frozen food dispenser 100 includes the container 100, a controller 114, a motor 112, a dispenser tube 120, and the dispensing gun 122.

The container 100 includes a frozen food container 104 configured to store the frozen food 110, a dry ice container 106 configured to store dry ice, and a coolant container 108 configured to store a coolant. In some embodiments, the coolant can include propylene glycol, however, other coolants can be used depending on the embodiment. The container 100 may also house a plunger 113 operatively coupled to the motor 112. Thus, the motor 112 is configured to drive the frozen food from the container 102 by pushing the plunger 113 into the frozen food container 104. When the motor 112 actuates the plunger 113, the frozen food 110 is driven to the dispensing gun 122 via the delivery tube 120.

The mobile frozen food dispenser 100 can be configured to store and dispense various types of frozen foods 110, including but not limited to: ice cream (e.g., Turkish ice cream, which may have a relatively hard texture and resistance to melting along with include mastic, or soft-serve ice cream), gelato, frozen yogurt, milkshakes, etc. Depending on the implementation, the mobile frozen food dispenser 100 may be configured to dispense many different types of frozen products, and may be configured to dispense non-frozen products in certain embodiments.

The container 100 is configured to maintain a temperature of the frozen food 110 below a predetermined temperature, for example, to prevent the frozen food 110 from melting within the container and as the frozen food 110 is dispensed. As shown in FIGS. 1A and 1B, the frozen food container 104, the dry ice container 106 and the coolant container 108 are concentric with the frozen food container 104 in the center, the dry ice container 106 surrounding the frozen food container 104, and the coolant container 108 surrounding the dry ice container 106. Accordingly, by placing dry ice into the dry ice container 106, the dry ice container is able to cool both the frozen food 110 within the frozen food container 104 and the coolant within the coolant container 108. In some implementations, an insulating cover may also be attached to the exterior of the container 102 to prevent the coolant container from losing heat to the environment. In other implementations, the container 102 may have insulating properties, for example, using a double wall near the exterior surface of the container 102 to insulate the container 102 from the environment.

It will be understood that the present disclosure is not limited to concentric arrangement of the frozen food container 104, the dry ice container 106 and the coolant container 108. Other implementations are possible. For example, in some implementations, the dry ice container 106 and coolant container 108 may be separate from the frozen food container 104. In these implementations, the coolant container 108 may at least partially surround the dry ice container 106 such that the coolant can be cooled by the dry ice. The coolant may be circulated to cool the frozen food container 104 and/or the delivery tube 120 to prevent or slow the melting of the frozen food 110.

The frozen food container 104 can be implemented as a detachable canister that can be removed from the remainder of the container 100. Accordingly, after the frozen food 110 has been dispensed from the frozen food container 104, the frozen food container 104 can be replaced with a new frozen food container 104 full of frozen food 110, and the used frozen food container 104 can be washed and reloaded with frozen food. This allows the mobile frozen food dispenser 100 to be quickly reloaded, at the location where frozen food 110 is being dispensed to customers or at a separate cleaning location and then carried back to customers. In one non-limiting example, a plurality of modular frozen food containers 104 are provided. The modular nature of the frozen food containers 104 can reduce user error in replacing an empty frozen food container 104, as well as decrease downtime of the mobile frozen food dispenser 100 while replacing an empty frozen food container 104.

The container 102 can also include one or more straps 103 coupled to the container 102 and configured to be worn by an operator. For example, the container 102 can be worn on the operator's back and carried between locations. The container 102 can also have a holster 105 coupled to the one or more straps 103 or the container 102. The holster 105 can house the dispensing gun 122 when not in use, thereby freeing the operator's hands. In some embodiments, the holsters 105 can include a cavity configured to catch a certain amount of leakage from the dispensing gun 112. The container 102 can also include a housing for cones and/or cups into which the frozen food 110 can be dispensed and provided to customers.

The dispenser tube 120 connects the container 100 to the dispensing gun 122 and includes a delivery tube 118, insulation 132 covering at least a portion of the delivery tube 118, and an insulating sleeve 130 formed over the insulation 132 and the delivery tube 118. In some embodiments, the insulating sleeve 130 can be formed of neoprene, however, the insulating sleeve can include other insulating materials in other embodiments. The delivery tube 118 is configured to deliver the frozen food from the frozen food container 104 to the dispensing gun 122. In addition, the delivery tube 118 can be coupled to a flow control valve 116 configured to mechanically control flow of the frozen food through the dispenser tube 120. In some embodiments, the flow control valve 116 can be implemented as a solenoid valve or other electromechanically-operated valve that is configured to control flow based on an electrical signal, which may be received from the controller 114.

The delivery tube 118, the insulation 132, and the insulating sleeve 130 can include flexible materials that allow the user to move the dispensing gun 122 in a full range of motion and at different distances from the user as the frozen food is being dispensed. While the use of flexible materials for the delivery tube 118, the insulation 132, and the insulating sleeve 130 can enable the user to freely manipulate the dispensing gun 122, there may be additional design challenges to the use of a dispenser tube 120 including these flexible materials. For example, the flexing and/or moving of the delivery tube 118 to serve frozen food to different customers imparts mechanical energy to the frozen food 110 within the delivery tube 118, which can lead the frozen food 110 to melt more quickly. If the delivery tube 118 is not properly insulated and/or actively cooled, the frozen food may melt faster than desired or even melt into a liquid form. Aspects of this disclosure can address these challenges by providing active cooling to the tube (e.g., using the coolant line 125) as well as by providing the insulation 132 that can flex with—and does not hinder motion of—the delivery tube 118.

The dispenser tube 120 can further include a coolant line 125 located in proximity to the delivery tube 118 and configured to cool the frozen food located within the delivery tube 118 by circulating coolant along the length of the delivery tube 118. As shown in FIG. 1B, the coolant line 125 may form a loop that travels from the coolant container 108 along the delivery tube 118 to the dispensing gun 122 and back to the coolant container 108. The coolant line 125 can be positioned between the delivery tube 118 and the insulation 132. The coolant line 125 can also include a cold line 126 configured to receive the coolant from the coolant container 108 and a return line 128 configured to return the coolant to the coolant container 108 after the coolant has travelled through the coolant line 125. The cold line 126 can be connected to a coolant pump 124 configured to pump the coolant through the coolant line 125 so as to cool the frozen food located within the delivery tube 118.

With reference to FIG. 1C, the dispensing gun 122 includes a lever 134, a spring 136, an input 138, a dispenser valve 140, a valve collet 142, a coupling fitting 144, and a cable 146. The input 138 is configured to control dispensing of frozen food from the dispensing gun 122. The dispenser valve 140 is configured to dispense the frozen food when the pressure of the frozen food within the dispensing gun 122 exceeds a predetermined value. In some embodiments, the dispenser valve 140 can be implemented as a slit valve, which may be formed of silicon. Slit valves can be configured to open when pressurized and close once pressure is released. Depending on the design of the slit valve, a specific range of pressure values can control opening and closing of the slit valve. The slit valve can be configured to prevent leakage of the frozen food from the dispensing gun when the input 138 is not activated, for example, by ensuring that the pressure of the frozen food 110 is below a threshold pressure at which the slit valve will remain closed.

The valve collet 142 is configured to control flow of the frozen food into the dispenser valve 140. The compression spring 136 is configured to close the valve collet 142, and the lever 134 is configured to open the valve collet 142 by compressing the compression spring 136 when a force is applied to the lever 134. Thus, when no force is applied to the lever 134, the compression spring 136 can close off the passageway between the dispenser tube 120 and the dispenser valve 140, reducing the pressure applied to the dispenser valve 140 and preventing leakage of the frozen food.

The input 138 can be implemented as a switch used to control the dispensing of the frozen food from the dispensing gun 122. For example, the switch 138 can be a mechanical switch actuated by the lever 134 and can generate an electrical signal which is provided to the controller 114 via the cable 146. The controller 114 is connected to the input 138 via the cable 146 and is also connected to the coolant pump 124, the flow control valve 116, and the motor 112 via cables 148, 150, and 151, respectively. The cables 146, 148, 150, and 151 can be configured to transmit electrical signals between the controller 114 and each of the input 138, the coolant pump 124, the flow control valve 116, and the motor 112. The controller 114 can receive the signal from the input 138 and control the motor 112, the coolant pump 124, and the flow control valve 116 based on the received signal. In some embodiments, the signal received from the input may have one of two states, a first state including a command to dispense the frozen food and a second state including a command to stop dispensing the frozen food.

In response to receiving a signal from the input 138 which includes a command to dispense the frozen food 110, the controller 114 can control the motor 112 to drive the frozen food 110 from the frozen food container 104 into the dispenser tube 120, and control the flow control valve 116 to open, thereby allowing the frozen food 110 to flow into the dispenser tube 120 from the frozen food container 104. In response to receiving a signal from the input 138 which includes a command to stop dispensing the frozen food 110, the controller 114 can control the motor 112 to back-drive the motor 112 to release pressure in the frozen food container 104 and the dispenser tube 120, and control the flow control valve 116 to close, thereby preventing the frozen food 110 from flowing into the dispenser tube 120 from the frozen food container 104.

The controller 114 can also control the coolant pump 124 to pump coolant through the coolant line 125 in order to maintain the temperature of the frozen food 110 within the delivery tube 118 below a predetermined temperature. For example, in some embodiments, the controller 114 can be configured to run the coolant pump 124 continuously, at pre-determined intervals, while the frozen food 110 is being dispensed, and/or while the frozen food 110 is not being dispensed. In other embodiments, the controller 114 may receive a signal from a thermometer (not illustrated) located in proximity to the delivery tube 118 and run the coolant pump 124 in response to the temperature indicated by the signal received from the thermometer falling below a pre-determined temperature.

Advantageously, the cold line 126 and the return line 128 of the coolant line 125 can also run through the dispensing gun 122. Accordingly, the frozen food can be further cooled while located in the dispensing gun 122 via the coolant line 125.

Figure 2:
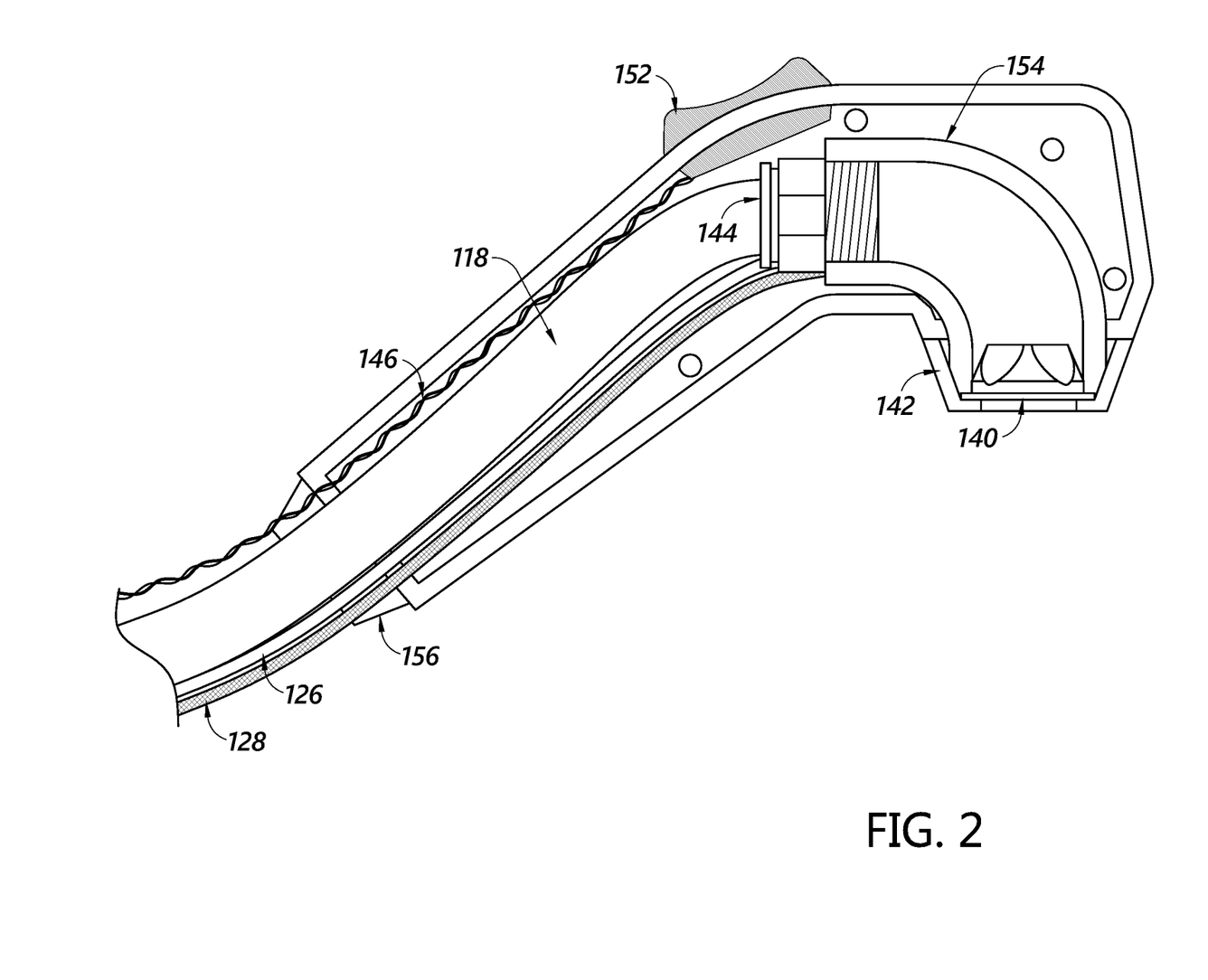
FIG. 2 illustrates a dispensing gun that can be used in the mobile frozen food dispenser in accordance with aspects of this disclosure.

FIG. 2 illustrates an alternate dispensing gun 123 that can be used in the mobile frozen food dispenser 100 in accordance with aspects of this disclosure. Similar to the dispensing gun 122 illustrated in FIG. 1C, the dispensing gun 123 of FIG. 2 includes a dispenser valve 140, a valve collet 142, a coupling fitting 144, a cable 146, a cold line 126 and a return line 128, which may function similarly to the corresponding components of the dispensing gun 122 of FIG. 1C.

The dispensing gun 123 further includes a switch 152, a flow control chamber 154, and a union collet 156.

The switch 152 can form an input used to control the dispensing of the frozen food 110 from the dispensing gun 123. For example, the switch 152 can provide a signal to the controller 114 via the cable 146 in which the signal can have one of two states, a first state including a command to dispense the frozen food and a second state including a command to stop dispensing the frozen food. The flow control chamber 154 fluidly connects the delivery tube 118 to the dispenser valve 140. The inner contours of the flow control chamber 154 can be configured to control the flow of the frozen food 110 as the frozen food 110 is dispensed from the dispensing gun 123. For example, the flow control chamber 154 may have inner contours configured to impose a pressure gradient on the frozen food 110 as the frozen food 110 is dispensed. The union collet 156 couples the dispenser tube 120 to the body of the dispensing gun 122.

Figure 3A:
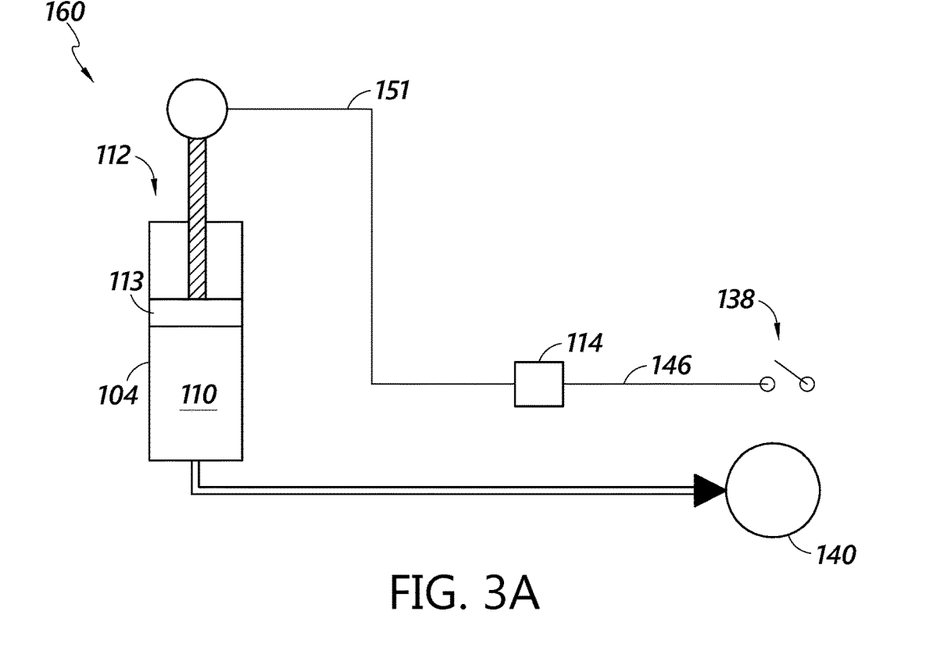
FIGS. 3A and 3B are diagrams which illustrate embodiments of a control system which can be used to control the mobile frozen food dispenser in accordance with aspects of this disclosure.
Figure 3B:
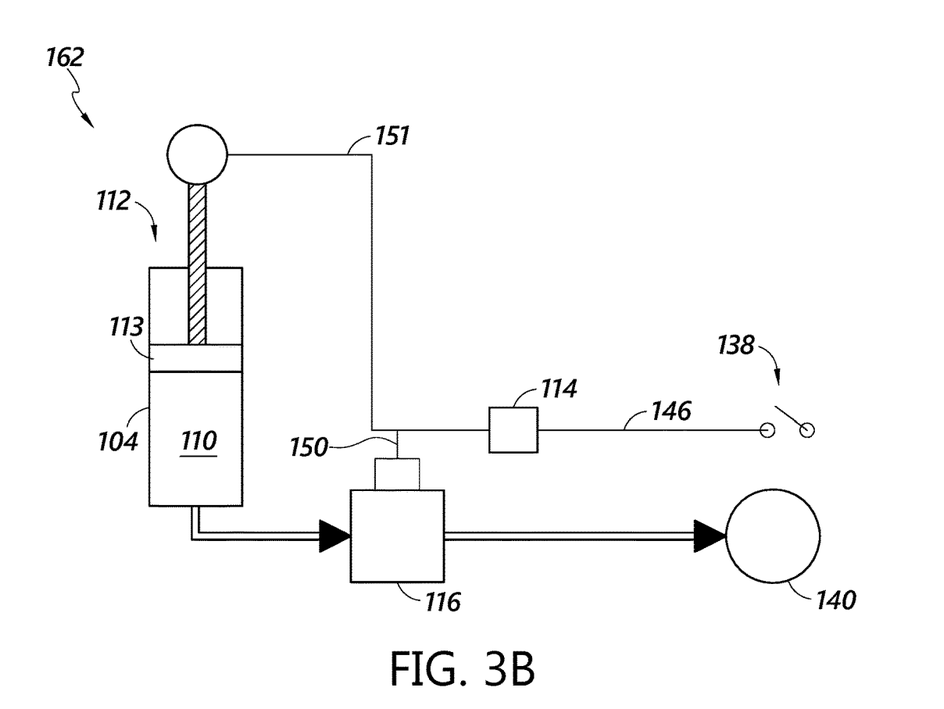

FIGS. 3A and 3B are diagrams which illustrate embodiments of a control system 160, 162 which can be used to control the mobile frozen food dispenser 100 in accordance with aspects of this disclosure. In the embodiment illustrated in FIG. 3A, the control system 160 includes the frozen food container 104, the motor 112, the plunger 113, the controller 114, the switch 138, the dispenser valve 140, and the cables 146 and 151. In this embodiment, the mobile frozen food dispenser 100 can function without the use of a flow control valve 116. As shown in FIG. 3A, the controller 114 can control the motor 112 to drive the frozen food 110 from the frozen food container 104 into the dispenser tube 120 to be dispensed from the dispenser valve 140.

In particular, the controller 114 can receive a signal from the switch 138 via the cable 146, where the signal includes a command to either dispense or stop dispensing the frozen food 110. Based on the signal received from the switch 138, the controller 114 can send a signal to the motor 112 via the cable 151 to control the motor 112 to drive the plunger 113 into the frozen food container 104, increasing the pressure of the frozen food 110 in order to dispense the frozen food 110 from the dispenser valve 140. The controller 114 can also back-drive the motor 112 to release pressure in the frozen food container 104. The controller 114 can back-drive the motor 112, for example, upon receipt of a signal from the input 138 that includes a command to stop dispensing the frozen food 110. By relieving the pressure of the frozen food 110, the potential for the frozen food to leak from the dispenser valve 140 can be reduced, particularly when the dispenser valve 140 is implemented as a slit valve. For example, a relatively higher pressure of the frozen food 110 (e.g., when located in the delivery tube 118) can increase the temperature of the frozen food 110, which can result in the frozen food 110 melting. In embodiments where a flow control valve 116 is not provided, the frozen food container 104 may be fluidly connected to the delivery tube 118, and thus, the pressure of the frozen food 110 located in the delivery tube 118 and the frozen food container 104 may be substantially the same, subject to variances due to gravity. In embodiments including the flow control valve 116, the controller 114 can back-drive the motor 112 to release the pressure of the frozen food 110 in the delivery tube 118 prior to closing the flow control valve 116.

In this embodiment, the mobile frozen food dispenser 100 can function without the use of a flow control valve 116. As shown in FIG. 3A, the controller 114 can control the motor 112 to drive the frozen food 110 from the frozen food container 104 into the dispenser tube 120 to be dispensed from the dispenser valve 140.

In the embodiment illustrated in FIG. 3B, the control system 162 includes the frozen food container 104, the motor 112, the plunger 113, the controller 114, the switch 138, the dispenser valve 140, and the cables 146 and 149, similar to the control system 162 of FIG. 3A, and further includes the flow control valve 116. The flow control valve 116 can be embodied as a solenoid valve. Thus, in addition to controlling the motor 112, the controller 114 can also control the solenoid valve 116 via the cable 150. Specifically, while controlling the motor 112 to drive the plunger, the controller 114 may also command the solenoid valve 116 to open, allowing the frozen food to flow into the dispenser tube 120.

When the controller 114 receives a signal from the switch 138 with a command to stop dispensing the frozen food 110, the controller 114 can control the solenoid valve 116 to close, thereby providing an additional control on the pressure in the delivery tube 118. For example, since the delivery tube 118 may be connected at the bottom of the frozen food container 104, the weight of the frozen food 110 in the frozen food container 104 will exert pressure on the frozen food 110 in the delivery tube 118. The solenoid valve 116 can prevent the weight of the frozen food 110 in the frozen food container 104 from exerting a force on the frozen food 110 located in the delivery tube 118 by cutting off the fluid connection therebetween. Thus, by cutting off the pressure of the frozen food 110 in the frozen food container 104, the pressure of the frozen food 110 in the dispenser tube 120 can be reduced. Advantageously, since increased pressure can result in an increased temperature, reducing the pressure of the frozen food 110 in the delivery tube 118 can reduce the melt rate of the frozen food 110. This can help reduce and/or eliminate leaking of the frozen food 110 from the dispenser gun 122.

Figure 4:
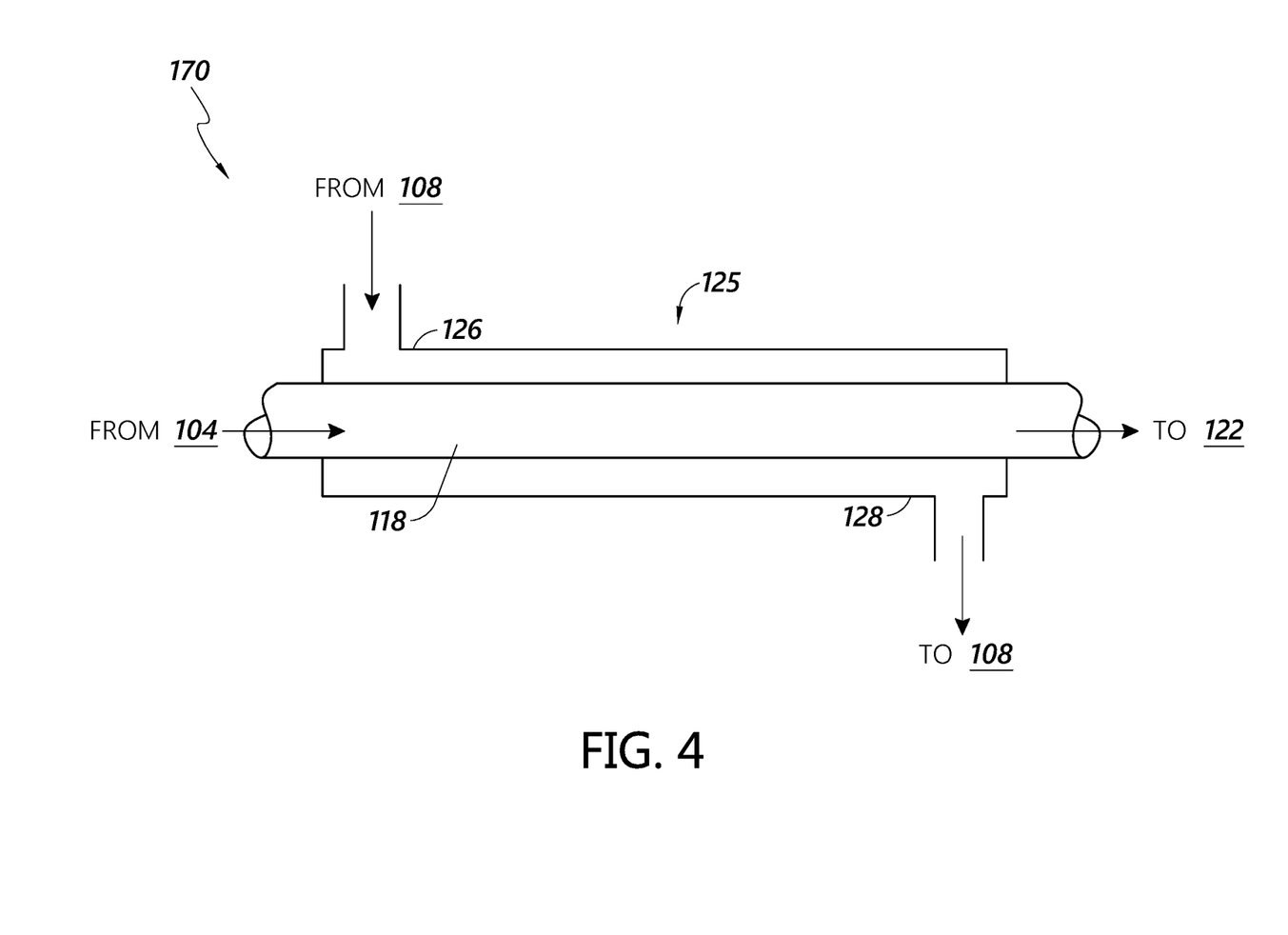
FIG. 4 is a diagram schematically illustrating a delivery tube cooling system for the mobile frozen food dispenser in accordance with aspects of this disclosure.

FIG. 4 is a diagram schematically illustrating a delivery tube cooling system 170 for the mobile frozen food dispenser 100 in accordance with aspects of this disclosure. As shown in FIG. 4, the cooling system includes the delivery tube 118 and the coolant line 125, which includes the cold line 126 on the left side of the figure and the return line 128 on the right side of the figure. It will be understood that implementations of the mobile frozen food dispenser 100 are not limited to this specific orientation, and other configuration are possible. The delivery tube 118 receives the frozen food 110 from the frozen food container 104 and provides the frozen food to the dispenser gun 122. In addition, the cold line 126 receives the coolant from the coolant container 108 and the return line 128 provides the coolant back to the coolant container 108 after the coolant has run through the coolant line 125.

The coolant line 125 and the delivery tube 118 can form a heat exchanger configured to draw heat from the frozen food 110 located in the delivery tube 118 into the coolant flowing through the coolant line 125. Although the coolant line 125 is schematically illustrated as surrounding the delivery tube 118, the coolant line 125 can be arranged in various different configurations in proximity to the delivery tube 118 (e.g., as shown in FIG. 1B), as long as there is sufficient heat exchange between the delivery tube 118 and the coolant line 125. Thus, the specific configuration of the coolant line 125 is not limited to the embodiments illustrated in FIGS. 1B and 4.

Figure 5:
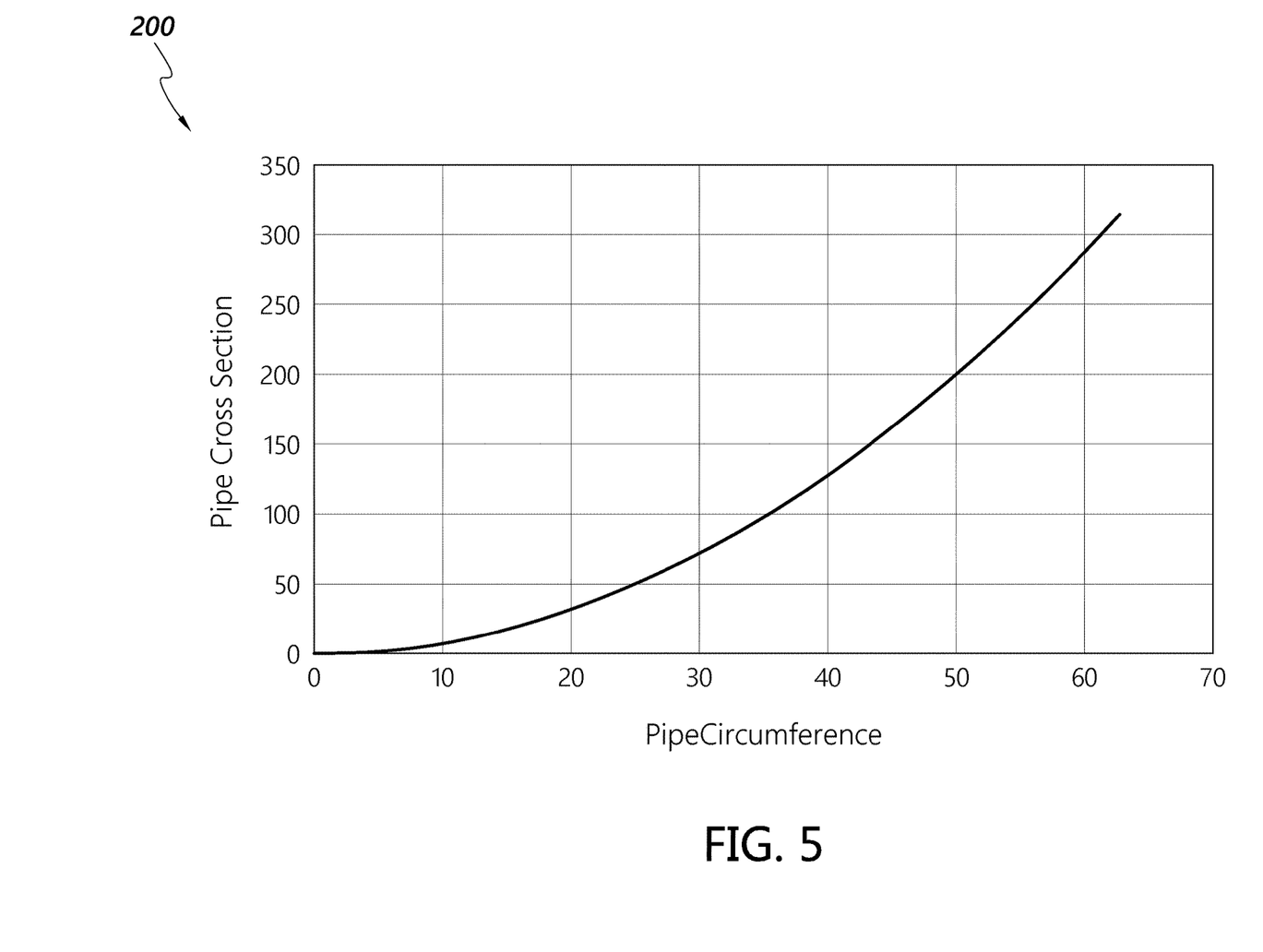
FIG. 5 is a graph illustrating the relationship between the pipe circumference and the pipe cross sectional area for the inner lumen of the delivery tube in accordance with aspects of this disclosure.

The mobile frozen food dispenser according to the disclosure advantageously addresses unique challenges associated with dispensing a frozen food in a mobile device. For example, the inner diameter of the delivery tube 118 is an important parameter that can affect the flow rate and the melt rate of the frozen food 110 as the frozen food 110 is dispensed. FIG. 5 is a graph 200 illustrating the relationship between the pipe circumference and the pipe cross-sectional area for the inner lumen of the delivery tube 118 in accordance with aspects of this disclosure. As shown in FIG. 5, the pipe cross-sectional area and the pipe circumference have a quadratic relationship. That is, the cross-sectional area of the delivery tube 118 is proportional to the square of the radius of the delivery tube 118, which is in turn linearly proportional to the pipe circumference.

A larger inner diameter increases the flow of the frozen food 110 through the delivery tube 118 by introducing less resistance compared to a smaller inner diameter. However, a larger inner diameter also increases the surface area of the inner lumen defined by the delivery tube 118, which results in greater heat transfer between the frozen food and the delivery tube, leading to increased melting. The inner diameter of the delivery tube 118 can also affect the flexibility of the delivery tube 118 and the tube's susceptibility to kinking. Thus, the inner diameter of the delivery tube 118 can be advantageously selected in order to adjust one or more of the flow rate, melt rate, the flexibility, and/or the susceptibility to kinking of the delivery tube 118.

While excessive melting of the frozen food 110 can result in an undesirable consistency of the dispensed frozen food 110, a certain amount of melting can make dispensing of the frozen food 110 easier. For example, a relatively hard or solid ice cream may not necessarily flow properly through the delivery tube 118. Thus, a certain amount of melting of the frozen food 110 may be desirable to improve or facilitate the dispensing of the frozen food 110 from the dispensing gun. The optimal melting parameters (e.g., the melt rate and/or amount of melting) may depend on the specific characteristics of the frozen food 110 to be dispensed, the environmental conditions such as temperature and humidity, and other parameters. In some embodiments, melting of the frozen food 110 can result in a "soft-serve" ice cream consistency, making it easier for the operator to serve the frozen food 110 into a cone or cup. Thus, inner diameter of the delivery tube 118 along with the amount of cooling provided by the control system 160, 162 can be selected to adjust the amount of melting to improve the ease of dispensing the frozen food 110. In some embodiments, it can be desirable to control the melting of the frozen food 110 such that the viscosity of the frozen food 110 is in the range 500-5000 cP.

Figure 6A:
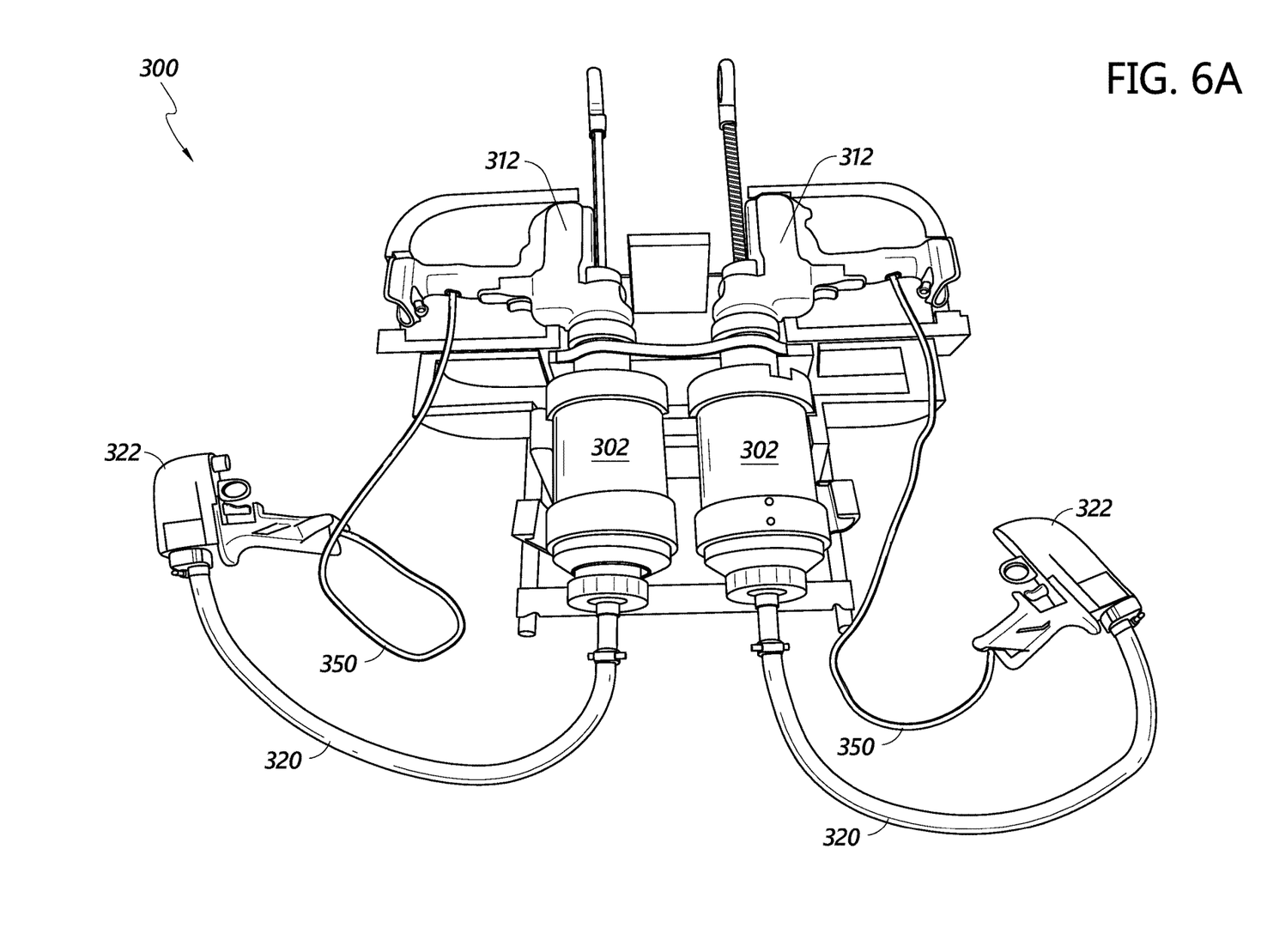
FIGS. 6A-6C illustrate another embodiment of a mobile frozen food dispenser in accordance with aspects of this disclosure.
Figure 6B:
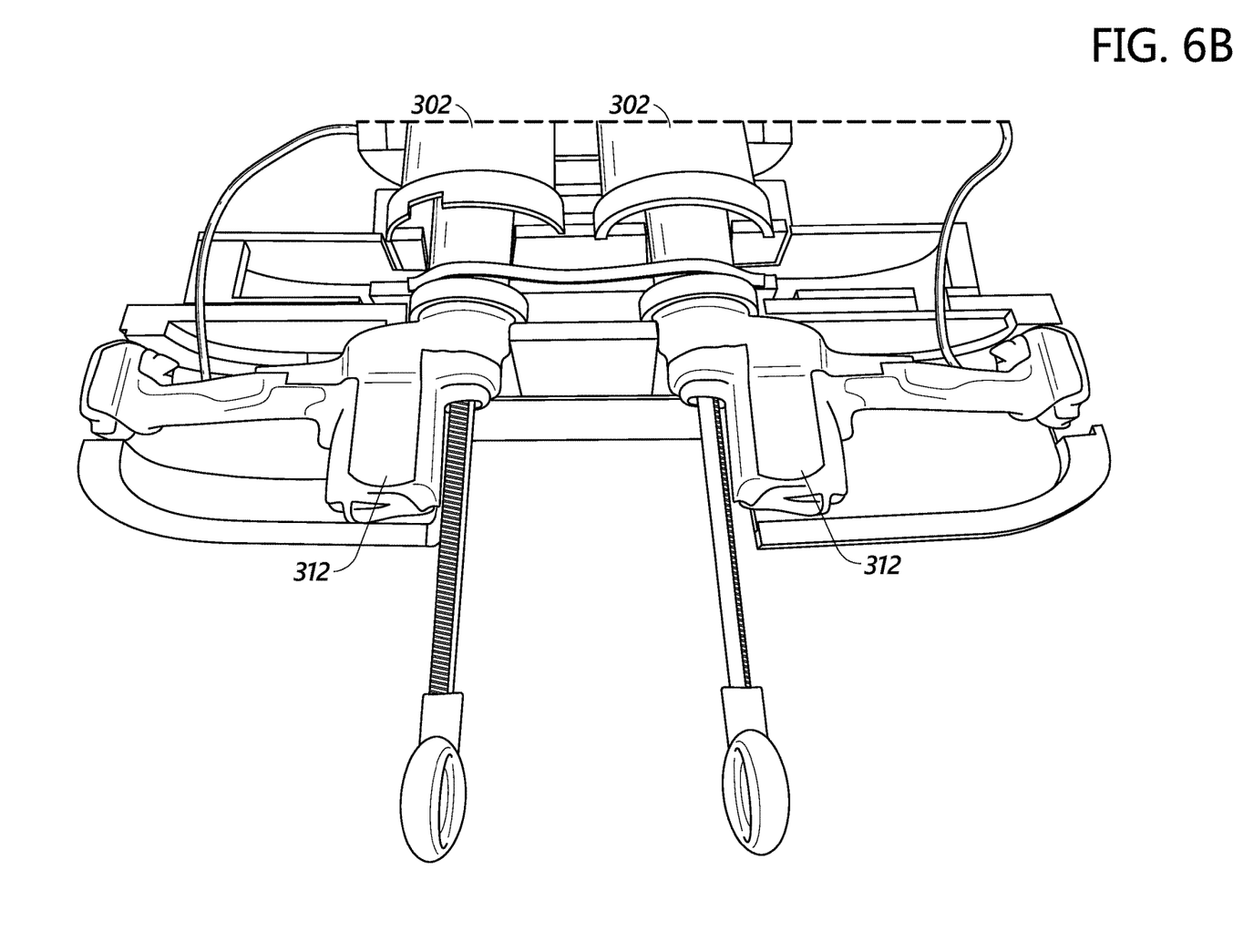
Figure 6C:
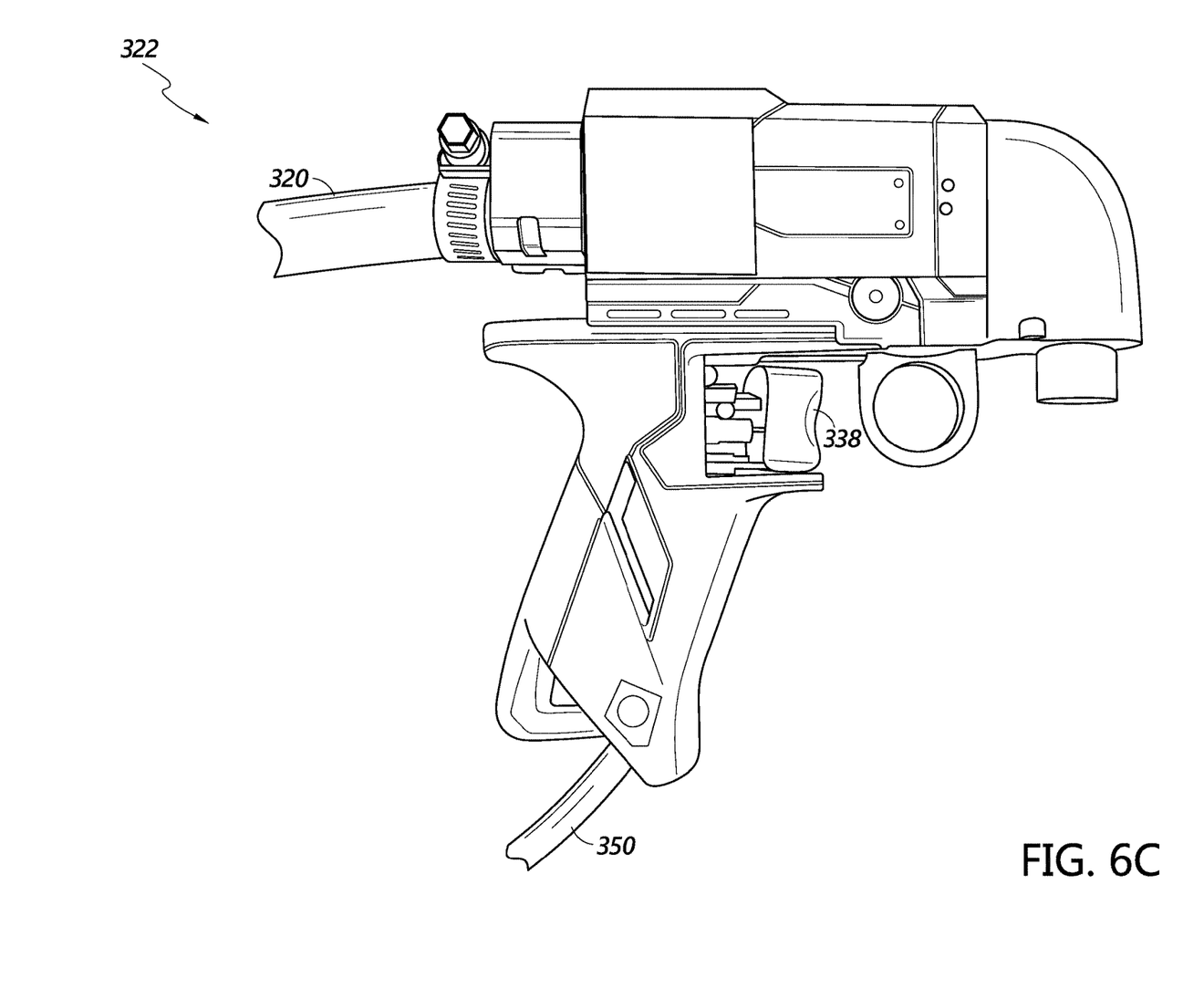

FIGS. 6A-6C illustrate another embodiment of a mobile frozen food dispenser 300 in accordance with aspects of this disclosure. In particular, FIGS. 6A-6C illustrate different views of a prototype mobile frozen food dispenser 300 according to the disclosure. The mobile frozen food dispenser 300 includes a pair of containers 302, a pair of motors 312, a pair of delivery tubes 320, and a pair of dispenser guns 322. FIG. 6C illustrates a view of one of the dispenser guns 322 which is connected to a corresponding one of the delivery tubes 320 and includes a trigger 338 and a cable 350 configured to provide a signal from the trigger to a corresponding one of the motors 312 to drive the frozen food through the delivery tube 320 to the dispensing gun 322.

In the embodiment illustrated in FIGS. 6A-6C, the containers 302 may function similar to a caulking gun in which the frozen food is driven from a given one of the containers 302 into the respective delivery tube 320 by a plunger housed in the container 302. It will be understood that aspects of this disclosure can use any driving mechanism that can move a solid or semi-solid from the container 302 into the delivery tube 302.

In accordance with aspects of this disclosure, the mobile frozen food dispenser 100, 300 can be loaded with frozen food by removing the frozen food container 104 from the mobile frozen food dispenser 100, loading the frozen food container 104 with frozen food 110, and reinstalling the frozen food container 104 onto the frozen food dispenser 100, 300. The frozen food dispenser 100, 300 can be worn on an operator's back, for example, using the one or more straps 103. In other implementations, the frozen food dispenser 100, 300 can be worn on the front of the operator's torso. The operator can withdraw a cone or cup and dispense the frozen food 110 into the cone or cup using the dispensing gun 122, 322. After sufficient frozen food 100 has been dispensed, the user can return the dispensing gun 122, 322 to the holster 105 and present the frozen food 100 to a customer.

Additional Embodiments

It will be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). In addition, different tasks or processes can be performed by different machines and/or computing systems that can function together.

The elements of a method, process, or algorithm described in connection with the embodiments disclosed herein can be embodied directly in hardware, in a software module stored in one or more memory devices and executed by one or more processors, or in a combination of the two. An example storage medium can be coupled to the processor such that the processor can read information from, and write information to, the storage medium. In the alternative, the storage medium can be integral to the processor. The storage medium can be volatile or nonvolatile.

What is claimed is:

1. A mobile frozen food dispenser, comprising:
a dispensing gun comprising an input configured to control dispensing of frozen food from the dispensing gun;
a container configured to store the frozen food and maintain a temperature of the frozen food below a predetermined temperature;
a delivery tube connecting the container to the dispensing gun; and
a motor configured to drive the frozen food from the container to the dispensing gun via the delivery tube based on a signal received from the input.

2. The dispenser of claim 1, wherein the container comprises:
a frozen food container configured to store the frozen food,
a dry ice container configured to store dry ice, and
a coolant container configured to store a coolant.

3. The dispenser of claim 2, wherein the frozen food container, the dry ice container and the coolant container are concentric with the frozen food container in the center, the dry ice container surrounding the frozen food container, and the coolant container surrounding the dry ice container.

4. The dispenser of claim 2, further comprising:
a coolant line connected to the coolant container and located in proximity to the delivery tube; and
a coolant pump configured to pump the coolant through the coolant line so as to cool the frozen food located within the delivery tube.

5. The dispenser of claim 4, wherein the coolant line forms a loop with a first end of the coolant line comprising a cold line configured to receive the coolant from the coolant container and a second end of the coolant line comprises a return line configured to return the coolant to the coolant container after the coolant has travelled through the loop.

6. The dispenser of claim 4, further comprising:
an insulating sleeve formed over the delivery tube and the coolant line.

7. The dispenser of claim 1, further comprising:
a plunger housed in the container and operatively coupled to the motor,
wherein the motor is configured to drive the plunger into the container based on the signal received from the input so as to drive the frozen food from the container into the delivery tube.

8. The dispenser of claim 7, further comprising:
a solenoid valve coupled to the delivery tube, the solenoid valve configured to mechanically control flow of the frozen food through the delivery tube; and
a controller configured to receive the signal from the input and, in response to the signal received from the input including a command to dispense the frozen food, control the motor to drive the frozen food from the container into the delivery tube and control the solenoid valve to open, thereby allowing the frozen food to flow through the delivery tube.

9. The dispenser of claim 8, wherein the controller is further configured to back-drive the motor to release pressure in the container after the signal received from the input includes a command to stop dispensing the frozen food.

10. The dispenser of claim 1, further comprising:
one or more straps coupled to the container and configured to be worn by an operator; and
a holster coupled to the one or more straps and configured to house the dispensing gun when not in use.

11. The dispenser of claim 1, wherein the dispensing gun further comprises:
a slit valve configured to dispense the frozen food,
a valve collet configured to control flow of the frozen food into the slit valve,
a compression spring configured to close the valve collet, and
a lever configured to open the valve collet by compressing the compression spring,
wherein the input comprises a switch configured to be actuated by the lever.

12. The dispenser of claim 11, wherein the slit valve is formed of silicone and is further configured to prevent leakage of the frozen food from the dispensing gun when the switch is not activated.

13. The dispenser of claim 1, wherein the input comprises a switch configured to be actuated by an operator and control the motor to drive the frozen food from the container.

14. A frozen food dispenser, comprising:
a dispensing gun configured to dispense frozen food;
a container configured to be carried by a user, the container comprising:

a frozen food container configured to store the frozen food, a coolant container configured to store a coolant, and a dry ice container configured to store dry ice and cool the frozen food and the coolant;

a delivery tube connecting the container to the dispensing gun and comprising a coolant line configured to circulate the coolant so as to cool the frozen food when located in the delivery tube.

15. The dispenser of claim 14, wherein the container further comprises:

a motor configured to drive the frozen food from the frozen food container to the dispensing gun via the delivery tube.

16. The dispenser of claim 15, wherein:

the dispensing gun comprises an input configured to output a signal, and the dispenser further comprises a controller configured to receive the signal from the input and, in response to the signal received from the input including a command to dispense the frozen food, control the motor to drive the frozen food from the frozen food container into the delivery tube.

17. The dispenser of claim 16, wherein the controller is further configured to back-drive the motor to release pressure in the container after the signal received from the input includes a command to stop dispensing the frozen food.

18. The dispenser of claim 14, wherein the frozen food container, the dry ice container and the coolant container are concentric with the frozen food container in the center, the dry ice container surrounding the frozen food container, and the coolant container surrounding the dry ice container.

19. The dispenser of claim 14, further comprising:

a coolant pump configured to pump the coolant through the coolant line so as to cool the frozen food located within the delivery tube.

20. The dispenser of claim 19, further comprising:

an insulating sleeve formed over the delivery tube and the coolant line.

* * * * *